(12) United States Patent
Howell et al.

(10) Patent No.: US 7,192,136 B2
(45) Date of Patent: Mar. 20, 2007

(54) TETHERED ELECTRICAL COMPONENTS FOR EYEGLASSES

(76) Inventors: Thomas A. Howell, 567 Homer Ave., Palo Alto, CA (US) 94301; David Chao, 14137 Sobey Rd., Saratoga, CA (US) 95070; C. Douglass Thomas, 1193 Capri Dr., Campbell, CA (US) 95008; Peter P. Tong, 1807 Limetree La., Mountain View, CA (US) 94040

( * ) Notice: Subject to any disclaimer, the term of this patent is extended or adjusted under 35 U.S.C. 154(b) by 0 days.

(21) Appl. No.: 10/964,011

(22) Filed: Oct. 12, 2004

(65) Prior Publication Data

US 2005/0078274 A1 Apr. 14, 2005

Related U.S. Application Data

(60) Provisional application No. 60/509,631, filed on Oct. 9, 2003, provisional application No. 60/527,565, filed on Dec. 8, 2003, provisional application No. 60/562,798, filed on Apr. 15, 2004, provisional application No. 60/583,169, filed on Jun. 26, 2004, provisional application No. 60/592,045, filed on Jul. 28, 2004, provisional application No. 60/605,191, filed on Aug. 28, 2004, provisional application No. 60/462,591, filed on Apr. 15, 2003, provisional application No. 60/618,107, filed on Oct. 12, 2004.

(51) Int. Cl.
G02C 1/00 (2006.01)
(52) U.S. Cl. ............................ 351/158; 351/41
(58) Field of Classification Search ............ 351/41, 351/158, 111, 157, 156, 121; 381/381
See application file for complete search history.

(56) References Cited

U.S. PATENT DOCUMENTS

| | | |
|---|---|---|
| 320,558 A | 6/1885 | Hull |
| 669,949 A | 3/1901 | Underwood |
| 1,255,265 A | 2/1918 | Zachara |
| 2,638,532 A | 5/1953 | Brady |
| 2,904,670 A | 9/1959 | Calmes |
| 3,060,308 A | 10/1962 | Fortuna |
| 3,597,054 A | 8/1971 | Winter |
| 3,710,115 A | 1/1973 | Jubb |
| 4,165,487 A | 8/1979 | Corderman |

(Continued)

FOREIGN PATENT DOCUMENTS

CN 88203065 11/1988

(Continued)

OTHER PUBLICATIONS

"±1.5g Dual Axis Micromachined Accelerometer", Freescale Semiconductor, Inc., Motorla Semiconductor Technical Data, MMA6260Q, 2004, pp. 1-7.

(Continued)

*Primary Examiner*—Hung Xuan Dang

(57) ABSTRACT

Tethered electrical components coupled to electrical components in or attached to a pair of eyeglasses are disclosed. Tethered electrical components, alone or in combination with eyeglass electrical components, can be used for a variety of different applications and uses. As examples, the tethered electrical components can support signal capturing, signal processing, signal transmission, data acquisition, data processing, and/or data storage.

26 Claims, 10 Drawing Sheets

U.S. PATENT DOCUMENTS

| | | | |
|---|---|---|---|
| 4,254,451 A | 3/1981 | Cochran, Jr. | |
| 4,283,127 A | 8/1981 | Rosenwinkel et al. | |
| 4,322,585 A | 3/1982 | Liautaud | |
| 4,348,664 A | 9/1982 | Boschetti et al. | |
| 4,389,217 A | 6/1983 | Baughman et al. | |
| 4,526,473 A | 7/1985 | Zahn, III | |
| 4,608,492 A | 8/1986 | Burnham | |
| 4,683,587 A * | 7/1987 | Silverman | 381/311 |
| 4,751,691 A | 6/1988 | Perera | |
| 4,757,714 A | 7/1988 | Purdy et al. | |
| 4,773,095 A | 9/1988 | Zwicker et al. | |
| 4,822,160 A | 4/1989 | Tsai | |
| 4,822,161 A * | 4/1989 | Jimmy | 351/158 |
| 4,942,629 A | 7/1990 | Stadlmann | |
| 4,985,632 A | 1/1991 | Bianco et al. | |
| 5,008,548 A | 4/1991 | Gat | |
| 5,020,150 A | 5/1991 | Shannon | |
| 5,036,311 A | 7/1991 | Moran et al. | |
| 5,050,150 A | 9/1991 | Ikeda | |
| 5,093,576 A | 3/1992 | Edmond et al. | |
| 5,151,600 A | 9/1992 | Black | |
| 5,161,250 A | 11/1992 | Ianna et al. | |
| 5,172,256 A | 12/1992 | Sethofer et al. | |
| 5,306,917 A | 4/1994 | Black et al. | |
| 5,353,378 A | 10/1994 | Hoffman et al. | |
| 5,359,370 A | 10/1994 | Mugnier | |
| 5,367,345 A * | 11/1994 | da Silva | 351/123 |
| 5,379,464 A | 1/1995 | Schleger et al. | |
| 5,382,986 A | 1/1995 | Black et al. | |
| 5,394,005 A | 2/1995 | Brown et al. | |
| 5,452,480 A | 9/1995 | Ryden | |
| 5,457,751 A * | 10/1995 | Such | 381/375 |
| 5,500,532 A | 3/1996 | Kozicki | |
| D369,167 S | 4/1996 | Hanson et al. | |
| 5,513,384 A | 4/1996 | Brennan et al. | |
| 5,533,130 A | 7/1996 | Staton | |
| 5,581,090 A | 12/1996 | Goudjil | |
| 5,589,398 A | 12/1996 | Krause et al. | |
| 5,590,417 A | 12/1996 | Rydbeck | |
| 5,608,808 A | 3/1997 | da Silva | |
| 5,634,201 A | 5/1997 | Mooring | |
| 5,737,436 A | 4/1998 | Boyden | |
| 5,900,720 A | 5/1999 | Kallman et al. | |
| 5,946,071 A | 8/1999 | Feldman | |
| 5,966,746 A | 10/1999 | Reedy et al. | |
| 5,980,037 A | 11/1999 | Conway | |
| 5,988,812 A | 11/1999 | Wingate | |
| 5,992,996 A | 11/1999 | Sawyer | |
| 6,010,216 A | 1/2000 | Jesiek | |
| 6,013,919 A | 1/2000 | Schneider et al. | |
| 6,028,627 A | 2/2000 | Helmsderfer | |
| 6,046,455 A | 4/2000 | Ribi et al. | |
| 6,060,321 A | 5/2000 | Hovorka | |
| 6,061,580 A | 5/2000 | Altschul et al. | |
| 6,091,546 A | 7/2000 | Spitzer | |
| 6,154,552 A | 11/2000 | Koroljow et al. | |
| 6,236,969 B1 | 5/2001 | Ruppert et al. | |
| 6,243,578 B1 | 6/2001 | Koike | |
| 6,292,213 B1 | 9/2001 | Jones | |
| 6,301,367 B1 | 10/2001 | Boyden et al. | |
| 6,307,526 B1 | 10/2001 | Mann | |
| 6,343,858 B1 | 2/2002 | Zelman | |
| 6,349,001 B1 | 2/2002 | Spitzer | |
| 6,349,422 B1 | 2/2002 | Schleger et al. | |
| 6,478,736 B1 | 11/2002 | Mault | |
| 6,506,142 B2 | 1/2003 | Itoh et al. | |
| 6,513,532 B2 | 2/2003 | Mault et al. | |
| 6,517,203 B1 | 2/2003 | Blum et al. | |
| 6,539,336 B1 | 3/2003 | Vock et al. | |
| 6,542,081 B2 | 4/2003 | Torch | |
| 6,619,799 B1 | 9/2003 | Blum et al. | |
| 6,629,076 B1 | 9/2003 | Haken | |
| 6,729,726 B2 | 5/2004 | Miller et al. | |
| 6,764,194 B1 | 7/2004 | Cooper | |
| 6,792,401 B1 | 9/2004 | Nigro et al. | |
| 6,929,365 B2 | 8/2005 | Swab et al. | |
| 2001/0005230 A1 | 6/2001 | Ishikawa | |
| 2002/0081982 A1 | 6/2002 | Schwartz et al. | |
| 2002/0084990 A1 | 7/2002 | Peterson, III | |
| 2002/0089639 A1 | 7/2002 | Stamer et al. | |
| 2002/0090103 A1 | 7/2002 | Calisto, Jr. | |
| 2002/0098877 A1 | 7/2002 | Glezerman | |
| 2002/0109600 A1 | 8/2002 | Mault et al. | |
| 2002/0197961 A1 | 12/2002 | Warren | |
| 2003/0022690 A1 | 1/2003 | Beydea et al. | |
| 2003/0032449 A1 | 2/2003 | Giobbi | |
| 2003/0062046 A1 | 4/2003 | Weismann | |
| 2003/0065257 A1 | 4/2003 | Mault et al. | |
| 2003/0067585 A1 | 4/2003 | Miller et al. | |
| 2003/0068057 A1 | 4/2003 | Miller et al. | |
| 2003/0226987 A1 | 12/2003 | Ribi et al. | |
| 2004/0000733 A1 | 1/2004 | Swab et al. | |
| 2004/0063378 A1 | 4/2004 | Nelson | |
| 2004/0150986 A1 | 8/2004 | Chang | |
| 2004/0156012 A1 | 8/2004 | Jannard et al. | |
| 2004/0157649 A1 | 8/2004 | Jannard et al. | |
| 2004/0160571 A1 | 8/2004 | Jannard | |
| 2004/0160572 A1 | 8/2004 | Jannard | |
| 2005/0213026 A1* | 9/2005 | Da Pra' | 351/158 |

FOREIGN PATENT DOCUMENTS

| | | |
|---|---|---|
| CN | 89214222.7 | 3/1990 |
| CN | 90208199.3 | 11/1990 |
| EP | 1134491 A2 | 9/2001 |
| FR | 2530039 A1 | 1/1984 |
| GB | 1467982 | 3/1977 |
| JP | 02-181722 | 7/1990 |
| JP | 09-017204 | 1/1997 |
| JP | 10-161072 | 6/1998 |
| JP | 2000-039595 | 2/2000 |
| TW | 484711 | 6/2001 |
| WO | WO 1997/12205 A1 | 4/1997 |
| WO | WO 2002/06881 A2 | 1/2002 |
| WO | WO 2003/069394 A1 | 8/2003 |
| WO | WO 2003/100368 A1 | 12/2003 |
| WO | WO 2004/012477 A2 | 2/2004 |
| WO | WO 2004/025554 A1 | 3/2004 |

OTHER PUBLICATIONS

"APA Announces Shipment of the SunUV™ Personal UV Monitor", Press Release, Nov. 7, 2003, pp. 1-3.

"Camera Specs Take Candid Snaps", BBC News, Sep. 18, 2003, pp. 1-3.

"Cardo Wireless Attaching Clips and Wearing Headser", Cardo Systems, Inc., http://www.cardowireless.com/clips.php, downloaded Nov. 27, 2004, pp. 1-3.

"Environmental Health Criteria 14: Ultraviolet Radiation", International Programme on Chemical Safety, World Health Organization Geneva, 1979 http://www.ichem.org., pp. 1-102.

"Eyetop", Product-Features, eyetop eyewear, eyetop belt worn, http://www.eyetop.net/products/eyetop/features.asp., downloaded Nov. 6, 2003, pp. 1-2.

"Exclusive Media Event Marks Debut of Oakley Thump: World's First Digital Audio Eyewear", Oakley Investor Relations, Press Release, Nov. 15, 2004, pp. 1-2.

"Heart Rate Monitors", http://www.healthgoods.com, downloaded Dec. 4, 2004.

"How is the UV Index Calculated", SunWise Program, U.S. Environmental Protection Agency, http://www.epa.gov/sunwise/uvcalc.html, downloaded Oct. 14, 2004, pp. 1-2.

"Industrial UV Measurements", APA Optics, Inc., http://www.apaoptics.com/uv/, downloaded Jul. 12, 2004, p. 1.

"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.

"Oakley Thump: Sunglasses Meet MP3 Player", with image, http://news.designtechnica.com/article4665.html, Jul. 13, 2004.

"Personal UV monitor," Optics.org, http://optics.org/articles/news/6/6/7/1 (downloaded Dec. 20, 2003), Jun. 9, 2000, pp. 1-2.

"SafeSun Personal Ultraviolet Light Meter", http://healthchecksystems.com/safesun.htm, downloaded Jul. 12, 2004, pp. 1-4.

"SafeSun Personal UV Meter", Introduction, Optix Tech Inc., http://www.safesun.com, downloaded Feb. 5, 2004, pp. 1-2.

SafeSun Personal UV Meter, features, Optix Tech Inc., http://www.safesun.com/features.html, downloaded May 1, 2004, pp. 1-2.

"Sharper Image— The FM Pedometer", e-Corporate Gifts.com, http://www.e-corporategifts.com/sr353.html, downloaded Jan. 22, 2005, pp. 1-2.

"Sun UV™ Personal UV Monitor", APA Optics, Inc., http://www.apaoptics.com/sunuv/uvfacts.html, download Dec. 20, 2003, pp. 1-3.

"Ultraviolet Light and Sunglasses", Oberon's Frequently Asked Questions, http://www.oberoncompany.com/OBEnglish/FAQUV.html, downloaded Feb. 5, 2004, pp. 1-2.

"Ultraviolet Light Sensor", Barrett & Associates Engineering, http://www.barrettengineering.com/project_uvs.htm, downloaded Feb. 5, 2004, pp. 1-3.

"Ultraviolet Radiation (UVR)", Forum North, Ontario Ministry of Labour, http://www.3.mb.sympatico.ca/∫ericc/Ultraviolet%20Radiation.htm, downloaded Feb. 5, 2004, pp. 1-6.

"What Are Gripples?", Gripping Eyewear, Inc., http://www.grippingeyewear.com/whatare.html, downloaded Nov. 2, 2005.

"With Racing Heart", Skaloud et al, GPS World, Oct. 1, 2001, http://www.gpsworld.com/gpsworld/content/printContentPopup.jsp?id=1805, pp. 1-5.

Abrisa Product Information: Cold Mirrors, Abrisa, date unknown, p. 1.

Abrisa Product Information: Commercial Hot Mirror, Abrisa, date unknown, P. 1.

Alps Spectable, Air Conduction Glass, Bone Conduction Glass, htt;://www.alps-inter.com/spec.htm, downloaded Dec. 10, 2003, pp. 1-2.

Altimeter and Compass Watches, http://store.yahoo.com/snowshack/altimeter-watches.html, downloaded May 3, 2004, pp. 1-2.

Bonne Conduction Headgear HG16 Series, "Voiceducer," http://www.temco-j.co.jp/html/English/HG16.html, downloaded Dec. 10, 2003, pp. 1-3.

Camoy, David, "The Ultimate MP3 Player for Athletes? Could be.", CNET Reviews, May 14, 2004, pp. 1-4.

Clifford, Michelle A., "Accelerometers Jump into the Consumer Goods Market", Sensors Online, http://www.sensorsmag.com, Aug. 2004.

Cool Last Minute Gift Idias!, UltimateFatBurner Reviews and Articles, http://www.ultimatefatburner.com/gift-ideas.html, downloaded May 10, 2005, pp. 1-3.

Comfees,com, Adjustable Sports Band Style No. 1243, http://shop.store.yahoo.com/comfees/adsporbansty.html, downloaded Apr. 18, 2003, pp. 1-2.

Dixen, Brian, "ear-catching", Supertesten, Mobil, date unknown, pp. 37-41.

Global Solar UV Index, A Practical Guide, World Health Organization, 2002, pp. 1-28.

Grobart, Sam, "Digit-Sizing Your Computer Data", News Article, Sep. 2004, p. 1.

Life Monitor V1.1, Rhusoft Technologies Inc., http://www.rhusoft.com/lifemonitor/, Mar. 1, 2003, pp. 1-6.

Manes, Stephen, "Xtreme Cam", Forbes Magazine, Sep. 5, 2005, p. 96.

Mio, PhysiCal, http://www.gophysical.com/, downloaded Jan. 27, 2004, 5 pages.

Monitoring Athletes Performance-2002 Winter Olympic News from KSL, Jan. 23, 2002, http://2002.ksl.com/news-3885i.php, pp. 1-3.

Niwa, "UV Index Information", http://www.niwa.cri.nz/services/uvozone/uvi-info, downloaded Jul. 15, 2004, pp. 1-2.

Pärkkä, et al., "A Wireless Wellness Monitor for Personal Weight Management", VTT Information Technology, Tampere Finland, date unknown, p. 1.

Pedometer, Model HJ-112, Omron Instruction Manual, Omron Healthcare, Inc., 2003, pp. 1-27.

PNY Announces Executive Attaché USB 2.0 Flash Drive and Pen Series, Press Release, PNY Technologies, Las Vegas, Jan. 8, 2004, pp. 1-2.

PNY Technologies, "Executive Attaché" http://www.pny.com/products/flash/execattache.asp downloaded Nov. 16, 2005.

Polar WM41 and 42 weight management monitor, http://www.simplysports/polar/weight_management/wm41-42.htm, downloaded Jan. 28, 2004, pp. 1-3.

Questions Answers, Pedometer.com, http://www.pedometer.com, downloaded May 5, 2005.

RazrWire, Motorola, 2005, 1 page.

SafeSun Personal UV Meter, Scientific Data, Optix Tech Inc., http://www.safesun.com/scientific.html, downloaded May. 1, 2003, pp. 1-3.

SafeSun Sensor, User's Manual, Optix Tech Inc., date unknown.

SafeSun, Personal UV Meter, "Technical Specifications", Optix Tech Inc., http://www.safesun.com/technical.html, downloaded Jul. 12, 2004, pp. 1-2.

SafeSun, Personal UV Meter, Experiments, Optix Tech Inc., http://www.safesun.com/experiments.html, downloaded Feb. 5, 2004, pp. 1-2.

Shades of Fun, Blinking Light Glasses, http://www.shadesoffun.com/Nov/Novpgs-14.html, downloaded Jul. 9, 2005, pp. 1-4.

SportLine Fitness Pedometer-Model 360, UltimateFatBurner Superstore, http://www.ultimatefatburner-store.com/ac_004.html, downloaded May 10, 2005, pp. 1-2.

Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.

Stevens, Kathy, "Should I Use a Pedometer When I Walk?", Healtheon/WebMD, Arp. 14, 2000.

Sundgot, Jørgen "2nd-gen Motorola Bluetooth headset", InfoSync World, Mar. 1, 2003, http://www.infosync.no/news/2002/n/2841.html, pp. 1-2.

SunSensors, Segan Industries, Inc., http://www.segan-ind.com/sunsensor.htm, downloaded Feb. 5, 2004, pp.1-3.

SunUV™, Personal UV Monitor, APA Optics, Inc., http://www.apaoptics.com/sunuv/models.html, downloaded Dec. 20, 2003.

SunUV™, Personal UV Monitor User's Guide, APA Optics, Inc., 2003 pp. 1-52.

Talking Pedometer, Sportline, Inc., date unknown.

Top Silicon PIN Photodiode, PD93-21 C, Technical Data Sheet, Everlight, Electronics Co., Ltd., 2004, pp. 1-9.

UV Light Meter, UVA and UVB measurement, UV-340, Instruction Manual, Lutron, date unknown, pp. 1-5.

UV-Smart, UVA/B Monitor, Model EC-960-PW, Instruction Manual, Tanita Corporation of America, Inc., downloaded Nov. 16, 2001.

Vitaminder Personal Carb Counter with Convenient Key Chain, date unknown, pp. 1-4.

* cited by examiner

TETHERED ELECTRICAL COMPONENTS FOR EYEGLASSES

CROSS-REFERENCE TO RELATED APPLICATIONS

The application claims priority to: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

In addition, this application is related to: (i) U.S. patent application Ser. No. 10/822,218, filed Apr. 12, 2004, and entitled "EYEGLASSES FOR WIRELESS COMMUNICATIONS," which is hereby incorporated herein by reference; (ii) U.S. Provisional Patent Application No. 60/462,591, filed Apr. 15, 2003, and entitled "EYEGLASSES FOR WIRELESS COMMUNICATION," which is hereby incorporated herein by reference; and (iii) U.S. Provisional Patent Application No. 60/618,107, filed Oct. 12, 2004, and entitled "TETHERED ELECTRICAL COMPONENTS FOR EYEGLASSES," which is hereby incorporated herein by reference.

FIELD OF THE INVENTION

The present invention relates to eyeglasses and, more particularly, to tethered electrical components for eyeglasses.

BACKGROUND OF THE INVENTION

Traditionally, eyeglasses have not contained or made any use of electrical components. In recent years, attempts to include electrical components within eyeglasses have had limited success. For example, a small electrical component, such as a microphone, might be provided in or attached to an eyeglass frame. Unfortunately, however, larger scale electrical components are not easily provided in or attached to an eyeglass frame. Eyeglasses frames tend to be very compact and lightweight and thus have little space for electrical components. Moreover, since eyeglass frames are often fashionable items whose designs are important, there are substantial design tradeoffs involved with providing or attaching electrical components to eyeglass frames.

Accordingly, there is a need for improved approaches to facilitate use of electrical components with eyeglasses.

SUMMARY OF THE INVENTION

The invention relates to tethered electrical components for eyeglasses. According to a number of embodiments of the invention, an apparatus having one or more external electrical components can be tethered, through a tethering mechanism, to one or more electrical components within or attached to a pair of eyeglasses. The one or more external electrical components being tethered by the tethering mechanism, such as a cable or a cord, may be referred to herein as the 'tethered electrical components.' While the one or more electrical components in or attached to the glasses can be referred to herein as 'eyeglass electrical components.'

Tethered electrical components, alone or in combination with eyeglass electrical components can be used for a variety of different applications and uses. Examples of applications and uses include a wireless communication system, a radiation monitoring system, a health monitoring system or a fitness monitoring system. In one embodiment, the tethered electrical components can support wireless communication capabilities allowing a user to communicate with a communication device in a wireless and hands-free manner. In another embodiment, the tethered electrical components can support radiation monitoring such as for monitoring ultraviolet or solar radiation for a wearer of eyeglasses. In still other embodiments, the tethered electrical components can support health or fitness monitoring for a wearer of eyeglasses.

The tethered electrical components can support signal capturing, signal processing, signal transmission, data acquisition, data processing, and/or data storage. For example, the tethered electrical components can, for example, include a power source and/or an electronic controller. The tethered electrical components may also include and/or control one or more operation indicators to signal operational status of the tethered electrical components. In addition, the tethered electrical components may also include and/or control one or more sensors to monitor and/or signal conditions of users.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to tethered electrical components for eyeglasses. According to a number of embodiments of the invention, an apparatus having one or more external electrical components can be tethered, through a tethering mechanism, to one or more electrical components within or attached to a pair of eyeglasses. The one or more external electrical components being tethered by the tethering mechanism, such as a cable or a cord, may be referred to herein as the 'tethered electrical components.' While the one or more electrical components in or attached to the glasses can be referred to herein as 'eyeglass electrical components.'

Tethered electrical components, alone or in combination with eyeglass electrical components can be used for a variety of different applications and uses. Examples of applications and uses include a wireless communication system, a radiation monitoring system, a health monitoring system or a fitness monitoring system. In one embodiment, the tethered electrical components can support wireless communication capabilities allowing a user to communicate with a communication device in a wireless and hands-free manner. In another embodiment, the tethered electrical components can support radiation monitoring such as for monitoring ultraviolet or solar radiation for a wearer of eyeglasses. In still other embodiments, the tethered electrical components can support health or fitness monitoring for a wearer of eyeglasses.

The tethered electrical components can support signal capturing, signal processing, signal transmission, data acquisition, data processing, and/or data storage. For example, the tethered electrical components can, for example, include a power source and/or an electronic controller. The tethered electrical components may also include and/or control one or more operation indicators to signal operational status of the tethered electrical components. In addition, the tethered electrical components may also include and/or control one or more sensors to monitor and/or signal conditions of users.

Embodiments of different aspects of the invention are discussed below with reference to FIGS. 1–10. However, those skilled in the art will readily appreciate that the detailed description given herein with respect to these figures is for explanatory purposes as the invention extends beyond these limited embodiments.

Figure 1:
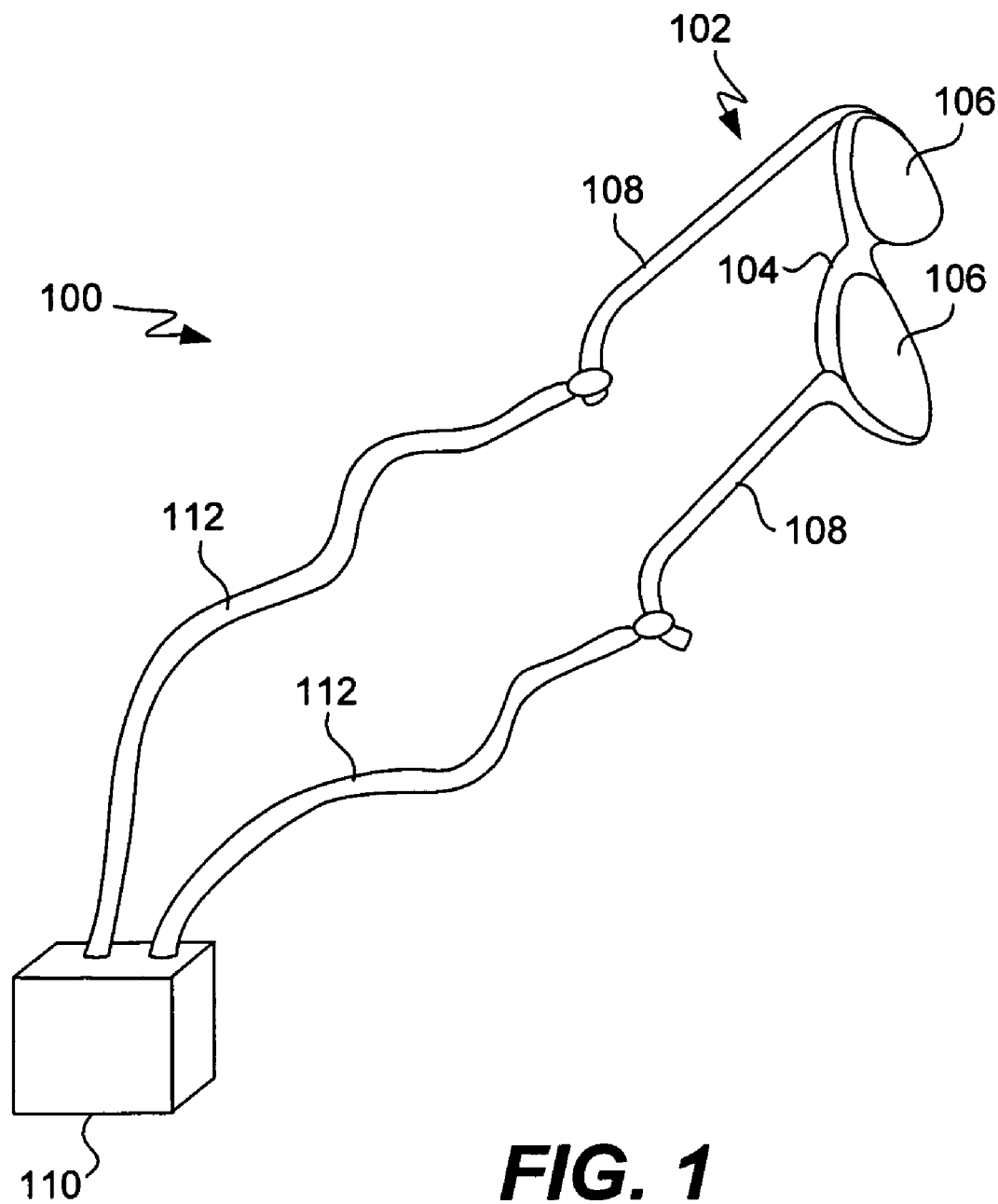
FIG. 1 is perspective diagram of an apparatus having tethered electrical components according to one embodiment of the invention.

FIG. 1 is a perspective diagram of an apparatus 100 having tethered electrical components according to one embodiment of the invention. The apparatus 100 is capable of affixing to a pair of eyeglasses 102. The eyeglasses 102 have a frame 104 that supports a pair of lenses 106. The frame 104 typically also includes a pair of arms 108. The arms 108 are also known as temples. When the eyeglasses 102 are being worn by a user, the arms 108 are placed about the user's head and supported by the user's ears so as to stably hold the eyeglasses 102 on the user's head.

In one embodiment, the apparatus 100 include a base 110 and at least one pair of cords 112. Typically, there is a pair of cords 112. The base 110 contains electrical components. The cords 112 can couple to the base 110 and can also couple to the arms 108 of the eyeglasses 102. With the cords 112 coupled to the arms 108 of the glasses 102, the cords 112 can also permit the eyeglasses 102 to dangle about the user's neck. At least one of the cords 112 contains an electrical conductor to carry electrical signals from the base 110 and through the at least one of the cords 112. As shown in FIG. 1, the cords 112 can connect to the arms 108 of the eyeglasses 102; hence, the electrical conductor can carry electrical signals between the base 110 and at least one of the arms 108 of the glasses 102. The electrical conductor could be a shielded conductive wire provided internal to at least one of the cords 112.

When referring to the cords 112, it should be understood that the cords can be (i) two separate cords that each extends from the base 110 to one of the arms 108 of the eyeglasses 102 (see FIG. 1), or (ii) a single cord that extends from the base 110 and then separates into two ends that couple to the arms 108 of the eyeglasses 102. The cords 112 can be made of a variety of different materials and may contain at least one electrical conductor. For example, the cords 112 can be made of plastic, string, fabric, wire, etc.

In one embodiment, instead of two separate pieces, the cords are connected together and form a continuous piece. The continuous piece can be a strap, like an electric strap. One example of a strap is a sports strap that snugly attaches eyeglasses to a user's head, often for sport activities. The two ends of the strap are coupled to the arms of the glasses. The coupling can be based on mechanical connectors (e.g., snaps, clips), part of which may be integral with the arms of the glasses, and the other part integral with the straps. The coupling can be on the temples, and located close to their corresponding lens holders.

In general, the cord(s) can also be referred to as a lanyard. In one embodiment, the base is removably attached to the cord(s). In another embodiment, the base can be integral with the cord(s).

The electrical components within the base 110 can vary in different embodiments. In one embodiment, the electrical components pertain to wireless communication circuitry, an antenna and/or a battery. In another embodiment, the electrical component pertains to radiation monitoring circuitry. In still another embodiment, the electrical component pertains to health or fitness monitoring.

Figure 2A:
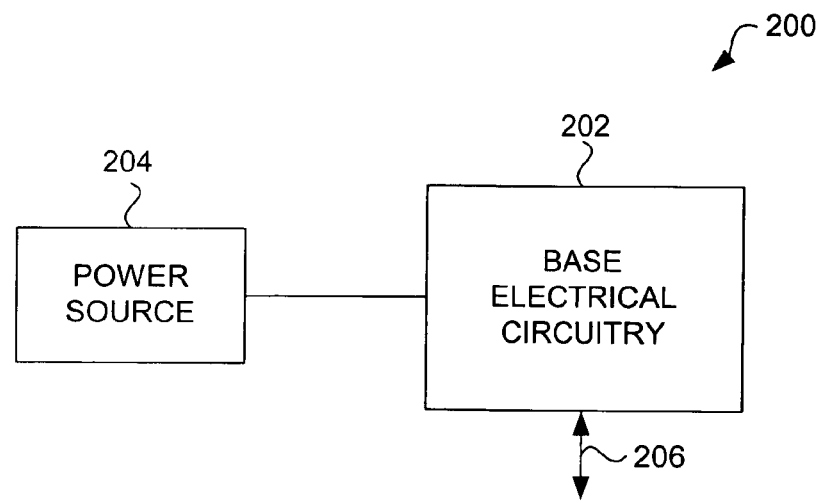
FIG. 2A is a block diagram of electrical components to be tethered to a pair of eyeglasses according to one embodiment of the invention.

FIG. 2A is a block diagram of electrical components 200 according to one embodiment of the invention. The electrical components 200 are, for example, suitable for use as the electrical components for the base 110 of FIG. 1. The electrical components 200 include base electrical circuitry 202 and a power source 204. The power source 204 can, for example, be at least one battery (rechargeable or non-rechargeable) and/or at least one solar cell. In another embodiment, the power source is not in the base but instead in at least one of the cords, the eyeglass frame, or other electronic device that can electrically couple to the base. The base electrical circuitry 202 varies with application and/or implementation. For example, the base electrical circuitry 202 can include one or more of: controller, memory, communication interface, I/O port, sensor, output device (e.g., display), switch, and connector port.

The base electrical circuitry 202 can also provide a link 206 to other electrical circuitry in a wired or wireless manner. The wired interaction can utilize a cord coupled to an eyeglass frame, or can use a cable coupled to a portable electronic device. The wireless interaction can utilize different types of frequencies, such as radio frequencies, infrared frequencies or optical frequencies. The other electrical circuitry can, for example, be (i) within an eyeglass frame (e.g., coupled via a cord), (ii) worn by a user, (iii) within a portable electronic device (e.g., mobile telephone, media player, camera), or (iv) within a remote control device.

Figure 2B:
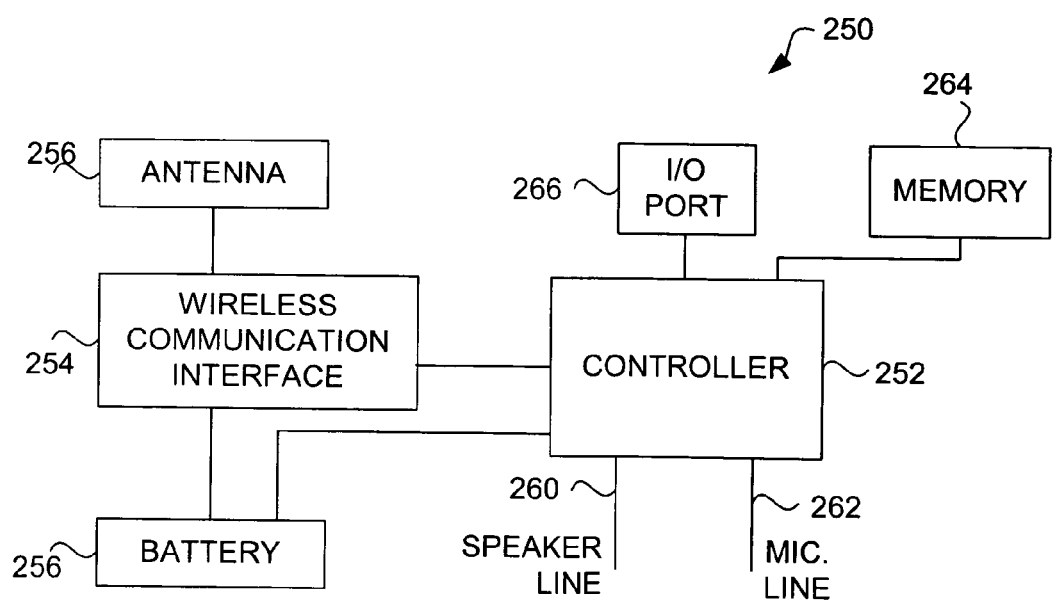
FIG. 2B is a block diagram of electrical components to be tethered to a pair of eyeglasses according to one embodiment of the invention.

FIG. 2B is a block diagram of electrical components 250 according to one embodiment of the invention. The electrical components 250 are, for example, suitable for use as the electrical components for the base 110 of FIG. 1. The electrical components 250 can also represent one representative, more specific embodiment of the electrical components 200 shown in FIG. 2A wherein wireless communication is to be supported. The electrical components 250 include a controller 252, a wireless communication interface 254, an antenna 256, and a battery 258. The controller 252 can manage the overall operation of the electrical components 250 and can output a speaker line 260 and receive a microphone line 262. The speaker line 260 and the microphone line 262 can be provided through at least one of the cords 112. In one embodiment, at least one of the cords 112 has a first electrical conductor that electrically connects to the speaker line 260, and a second electrical conductor that electrically connects to the microphone line 262.

The electrical components 250 can further include a memory 264 and an Input/Output (I/O) port 266. The memory 264 can store data for various purposes, such as programs, user preferences, and other data. The memory 264 can provide volatile (e.g., random access memory) or non-volatile (e.g., read-only memory, FLASH, etc.) data storage. The memory 264 can be implemented as semiconductor chips or a disk drive. The memory 264 can also be portable from the base 110, such as a memory card or removable disk drive. The I/O port 266 enables the base to receive or send additional signals to/from the base. The additional signals can be sent or received in a wireless manner (e.g., infrared, radio frequency) or a wired manner (e.g., with the assistance of a conductor within at least one of the cords). These additional signals can be from a user or from other electrical devices. As one example, a switch or sensor could send data to the I/O port 266. The switch can be user activated and, more generally, pertains to a user input. The switch, for example, could be provided to enable the user to signal other electrical components. As another example, a remote control can wirelessly send data to the I/O port 266 (e.g., to control some operation of at least some of the electrical components). As still another example, the I/O port 266 can send data to an output device, such as a light source, display device, etc.

At least one of the cords can be just a piece of flexible conductor encapsulated by a flexible insulator. Typically, a cord includes a number of electrical wires or conductors. There can be one or more electrical components in the base, and there can also be one or more electrical components in the cords. The different types of connectors in different embodiments can be located in the base. In one embodiment, a power source is an electrical component in the base tethered to a pair of glasses. In another embodiment, the glasses are tethered to a base that has a connector. The connector is connected to and draws power from an external electronic device. In this embodiment, electrical components in the glasses draw power from the external electronic device.

Figure 2C:
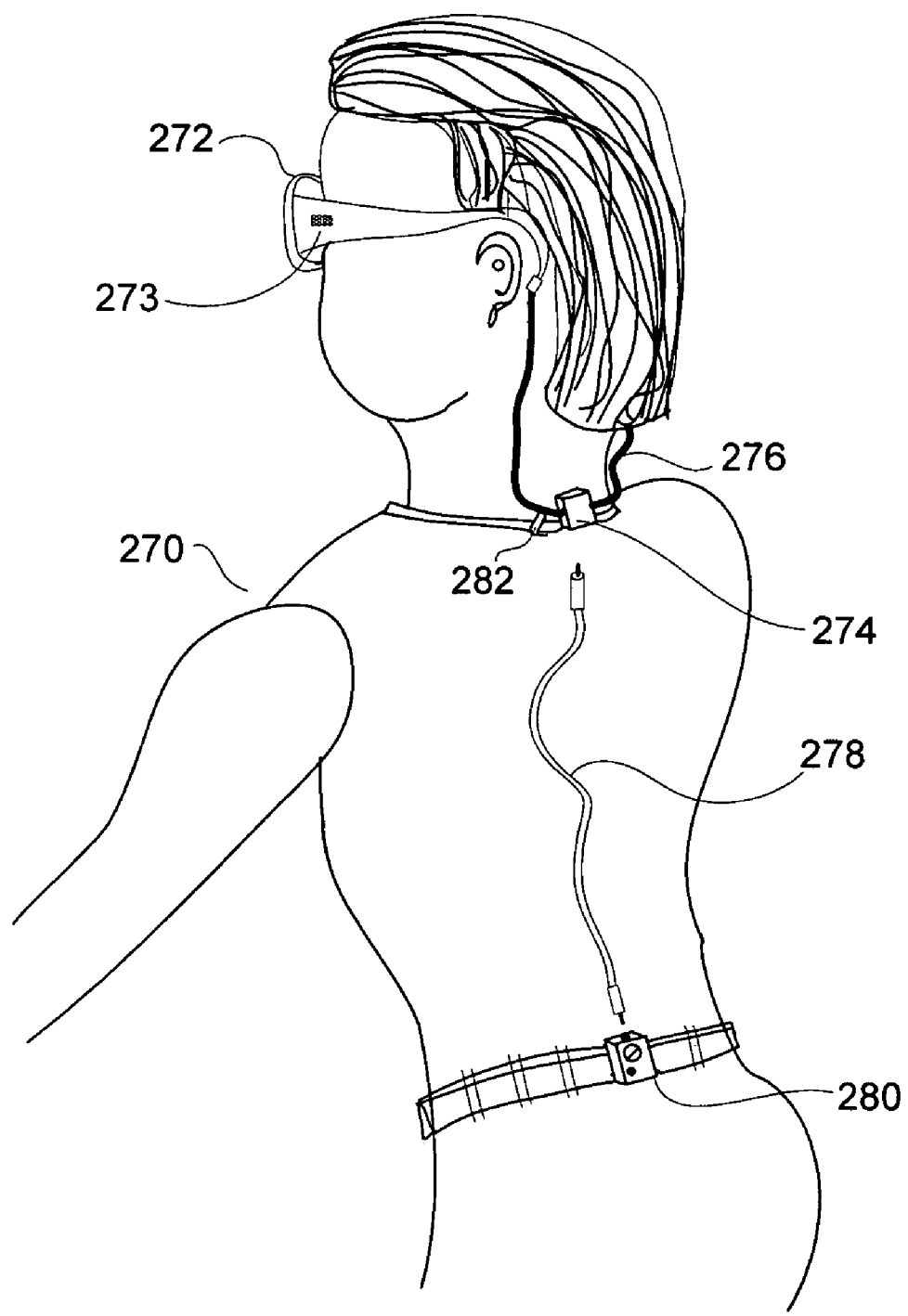
FIG. 2C shows an embodiment of the invention where a user is wearing a pair of glasses, which include electrical components, such as a speaker.

FIG. 2C shows an embodiment where a user 270 is wearing a pair of glasses 272, which include electrical components, such as a speaker 273. There are also tethered electrical components in a base 274, which is connected to the glasses 272 through a cord 276. In addition, there is a wire 278 (or cable) connected between a connector at the base 274 and a connector at a portable electronic device 280. The portable device 280 can be (a) a multimedia device, such as a MP3 player/recorder or a minidisk player, (b) a wireless communication device, such as a cell phone, or (c) a personal digital assistant, or other types of portable devices with computation, entertainment and/or communication capabilities.

In one embodiment, an attachment device 282 is used to support the base 274, the electrical components in the base 274 and/or the cord 276. For example, the attachment device 282 can be a pin, clip or Velcro®, or other suitable mechanisms. The attachment device 282 attaches at least a part of the base 274 and/or the cord 276 to the user's clothing. Alternatively or additionally, a similar attachment device can also serve to attach the wire 278 to the user's clothing.

The cords 112 as shown in FIG. 1 can couple to the frame 104 of the eyeglasses 102 in a variety of different ways. Additionally, one or more electrical components can be attached to or provided within the frame 104 of the eyeglasses 102—the eyeglass electrical components. In one embodiment, the eyeglass electrical components include a speaker and/or a microphone. In another embodiment, the eyeglass electrical components include a display device and/or a sensor.

FIGS. 3A–3D are diagrams of arrangements of a speaker and a microphone attached to an arm (i.e., temple) of a frame of a pair of eyeglasses according to a number of embodiments. In these arrangements, electrical components are attached to the eyeglasses so that the eyeglasses need not embed or otherwise include electrical components.

Figure 3A:
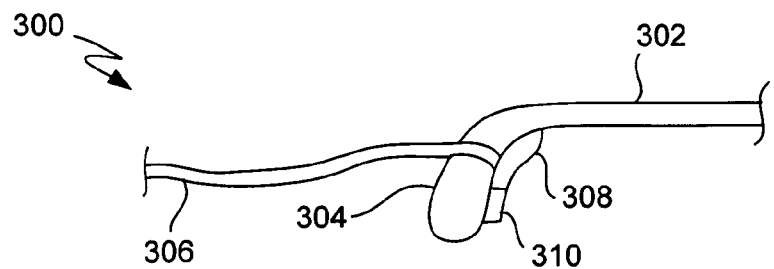
FIGS. 3A–3D are diagrams of arrangements of a speaker and a microphone provided proximate to an arm of a frame of a pair of eyeglasses according to different embodiments of the invention.

FIG. 3A is a diagram of an arrangement 300 of a cord 306 and eyeglass electrical components according to one embodiment. The cord 306 couples to an end portion 304 of an arm 302 of a pair of eyeglasses. In one embodiment, the end portion 304 can pertain to a temple tip or some portion thereof. One end of the cord 306 is electrically and mechanically coupled to eyeglass electrical components, such as a speaker 308 and a microphone 310. The speaker 308 and the microphone 310 are also coupled to the end portion 304 of the arm 302. When the cord 306 is coupled to the end portion 304 of the arm 302, the speaker 308 and the microphone 310 are also coupled against the end portion 304 of the arm 302.

Figure 3B:
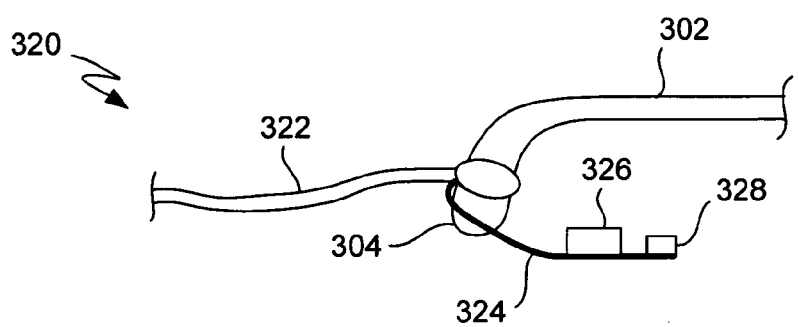

FIG. 3B is a diagram of an arrangement 320 of a cord 322 and eyeglass electrical components according to one embodiment. The cord 322 couples to the end portion 304 of the arm 302 of a pair of eyeglasses. The end portion of the cord 322 is coupled to eyeglass electrical components via an extension 324. The eyeglass electrical components carried by the extension 324 include, for example, a speaker 326 and a microphone 328. The extension 324 facilitates positioning of the speaker 326 and the microphone 328 relative to the pair of eyeglasses or its user.

Figure 3C:
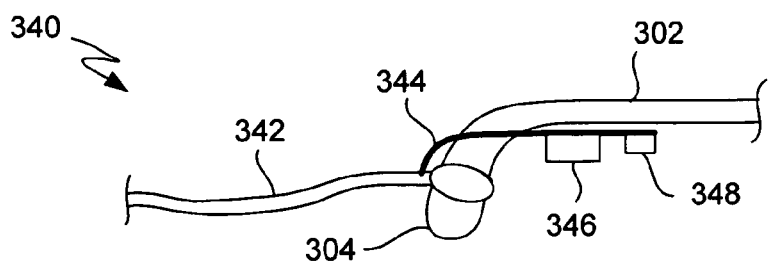

FIG. 3C is a diagram of an arrangement 340 of a cord 342 and eyeglass electrical components according to one embodiment. The cord 342 couples to the end portion 304 of the arm 302 of a pair of eyeglasses. The end portion of the cord 322 is coupled to eyeglass electrical components via an extension 344. The eyeglass electrical components carried by the extension 344 include, for example, a speaker 346 and a microphone 348. The extension 344 facilitates positioning of the speaker 346 and the microphone 348 relative to the pair of eyeglasses or its user.

The arrangement 340 is similar to the arrangement 320 but the extension 344 is positioned differently than the extension 324. It should be noted that that the extension 324 illustrated in FIG. 3B and/or the extension 344 illustrated in FIG. 3C can be rotatably attached to the end portion of the cord 322. In one embodiment, the extension 324 illustrated in FIG. 3B can rotate into the position of the extension 344 illustrated in FIG. 3C and vice versa.

Figure 3D:
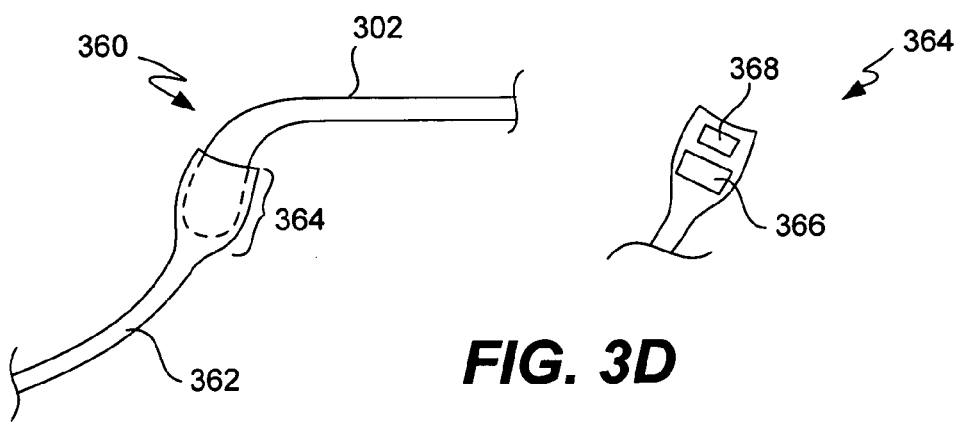

FIG. 3D is a diagram of an arrangement 360 of a cord 362 of eyeglass electrical components according to one embodiment. The cord 362 has an elastic end 364 that slides on an end portion of an arm 302 of a pair of eyeglasses. Eyeglass electrical components, such as a speaker 366 and a microphone 368, can be affixed or integral to the elastic end 364.

Figure 3E:
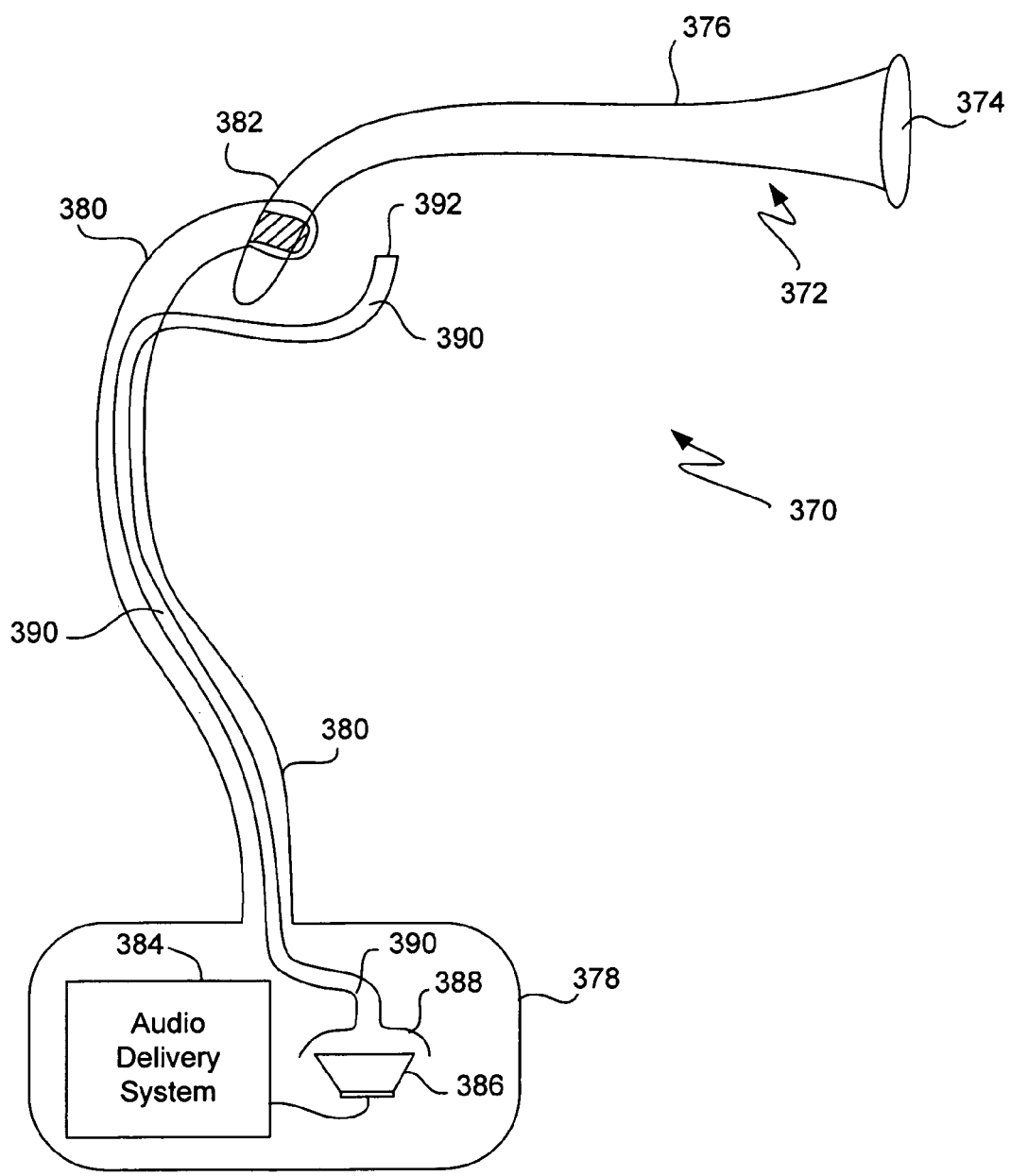
FIG. 3E is a diagram of an arrangement of a speaker in a base that provides audio output in the vicinity of an arm of a frame of a pair of eyeglasses according to another embodiment of the invention.

FIG. 3E is a diagram of an arrangement 370 of a speaker in a base that provides audio output in the vicinity of an arm of a frame of a pair of eyeglasses according to another embodiment. In particular, the arrangement 370 illustrates a pair of eyeglasses 372 having at least one lens 374 and at least one arm 376. A base 378 couples to the eyeglasses 372 by way of a cord 380. The cord 380 can be integral with the base 378 or attachable to the base 378. The cord 380 can attach to an end portion 382 of the arm 376. The base 378 includes an audio delivery system 384. The audio delivery system 384 can, for example, pertain to a MP3 player, a RF receiver (e.g., a radio), or a mini-compact disc player. The audio delivery system 384 outputs audio signals to a speaker 386 which provides an audio output. The audio output from the speaker 386 is directed by a funnel 388 into a tube 390 that extends from the funnel 388 through the cord 380. At an end 392 of the tube 390, the audio output is presented—namely, to a user of the eyeglasses 372. Note the tube 390 exits the cord 380 in the vicinity of its end that attached to the eyeglasses 372. As an example, the tube 390 can be a plastic tube. At least the portion of the tube 390 that is external to the cord 380 can be malleable to allow user adjustment relative to the user's ear.

Figure 4A:
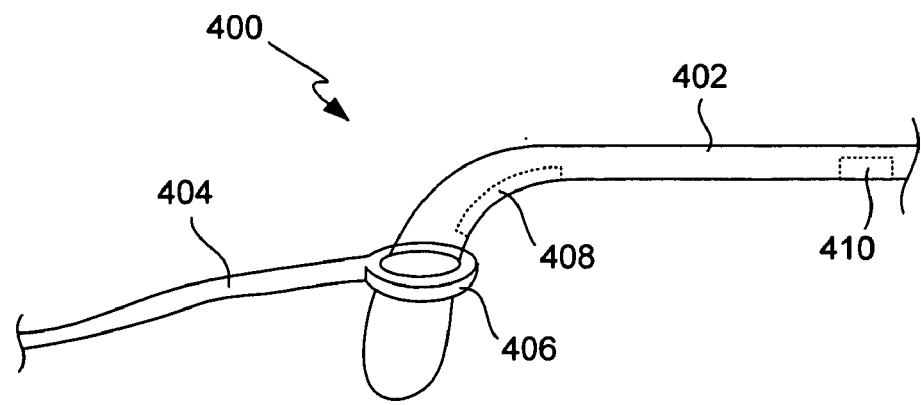
FIG. 4A is a diagram of an arrangement of an arm of a frame of a pair of eyeglasses and a cord of an apparatus having tethered electrical components according to one embodiment of the invention.

FIG. 4A is a diagram of an arrangement 400 of an arm 402 of a frame of a pair of eyeglasses and a cord 404 of an apparatus having tethered electrical components according to one embodiment. The cord 404 has a loop 406. The loop 406 can be used to secure the cord 404 to the arm 402. For example, the loop 406 can be elastic. The arm 402 includes eyeglass electrical components, such as a speaker 408 and a microphone 410, which are integral with the arm 402. In one embodiment, the speaker 408 and the microphone 410 are housed within the arm 402.

The cord 404 contains at least one electrical conductor and the arm 402 contains at least one electrical conductor. The securing of the cord 404 to the arm 402 not only physically secures the cord 404 to the arm 402 but also electrically connects the at least one electrical conductor within the cord 404 to the at least one electrical conductor within the arm 402. In this manner, electrical components within a base (e.g., base 110) coupled to the cord 404 can provide electrical signals to the speaker 408 and the microphone 410 within the arm 402.

Figure 4B:
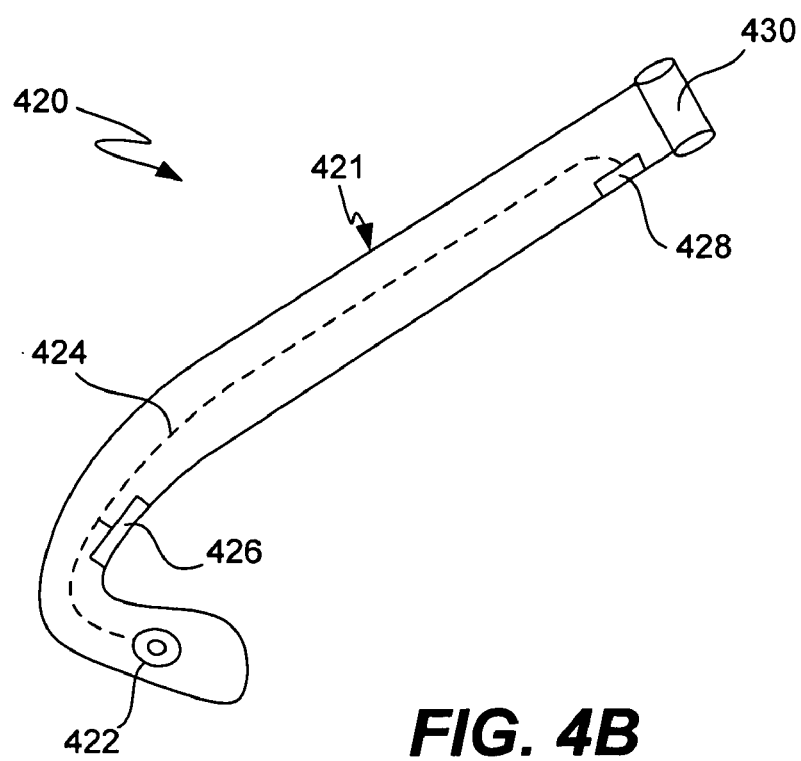
FIG. 4B is a diagram of an arrangement of an arm for a frame of a pair of eyeglasses with electrical components according to one embodiment of the invention.

FIG. 4B is a diagram of an arrangement 420 of an arm 421 for a frame of a pair of eyeglasses according to one embodiment. According to this arrangement 420, the arm 421 includes a connector port 422, a conductor 424 (e.g., wire), a speaker 426, and a microphone 428. The speaker 426 and the microphone 428 are eyeglass electrical components. In the present invention, a conductor is not considered an electrical component if the conductor's sole intended function is to provide electrical connections to two or more electrical components. As such, the conductor 424 is not considered an electrical component. In one embodiment, a connector is also not considered an electrical component. The conductor 424 is internal to the arm 412, and the speaker 426 and the microphone 428 may also be internal to the arm 412. The connector port 422 can receive a counterpart connector connected to a cord (e.g., cord 112), thereby electrically coupling a conductor within the cord to the conductor 424 within the arm 421. The arm 421 can be used as a replacement arm so as to convert a standard pair of eyeglasses into a pair of eyeglasses that can exploit tethered electrical components, such as for wireless communications. In one implementation, the arm 421 has a hinge portion 430 to couple the arm 421 to a frame of a pair of eyeglasses.

Figure 4C:
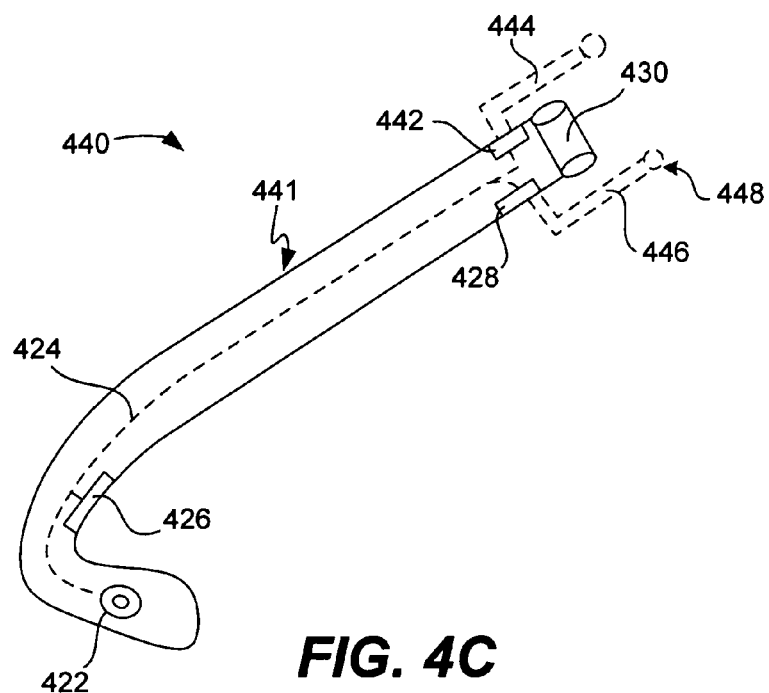
FIG. 4C is a diagram of an arrangement of an arm for a frame of a pair of eyeglasses with electrical components according to another embodiment of the invention.

FIG. 4C is a diagram of an arrangement 440 of an arm 441 for a frame of a pair of eyeglasses according to one embodiment. The arm 441 is generally similar to the arm 421 shown in FIG. 4B, but further includes additional eyeglass electrical components, such as a light source 442. The light source 442 can, for example, be a Light Emitting Diode (LED). The light source 442 can provide ornamental lighting to the frame or can serve as an indicator light. The indicator light can provide various indications, such as, in use, operational status of electrical components, user's mood, user's health condition, etc. Optionally, the arrangement 440 of the arm 441 can also include an extension 444 and/or an extension 446. The extension 444 can be used to direct light from the light source 442 to a different location. The extension 444 can be rotatable, malleable or retractable (e.g., folding out). In one embodiment, the extension 444 can be a light pipe. The extension 446 (e.g., a boom arm) can move the microphone 428 to an end 448 of the extension 446, thereby closer to the mouth of the user. In another embodiment, the same extension 444 or 446 can include the light from the light source 442 and the microphone 428.

Figure 5A:
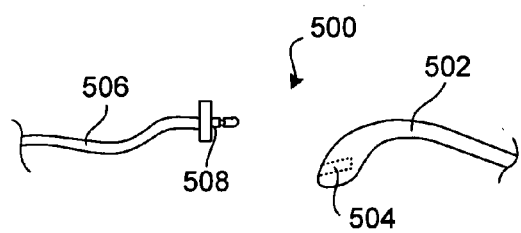
FIG. 5A is a diagram of a connection arrangement of an arm and a cord according to one embodiment of the invention.

FIG. 5A is a diagram of a connection arrangement 500 of an arm 502 of a pair of eyeglasses and a cord 506 according to one embodiment. The cord 506 is used to tether electrical components to the eyeglasses. The arm 502 includes a receptacle 504 (i.e., counterpart connector) for receiving a connector 508 connected to the cord 506. When the connector 508 is engaged within the receptacle 504, the cord 506 is physically and/or electrically connected to the arm 502. Alternatively, the cord 506 can include the receptacle 504 and the arm 502 can include the connector 508.

Figure 5B:
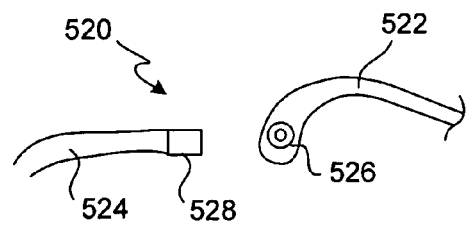
FIG. 5B is a diagram of a connection arrangement of an arm and a cord according to another embodiment of the invention.

FIG. 5B is a diagram of a connection arrangement 520 of an arm 522 of a pair of eyeglasses and a cord 524 according to another embodiment. The cord 524 is used to tether electrical components to the eyeglasses. The arm 522 has a connector 526 at an end region. The cord 524 contains a connector 528 at an end. The connectors 526 and 528 can couple together (i.e., connector pair) to provide physical and/or electrical connections between the arm 522 and the cord 524. In one implementation, the connector pair (connectors 526 and 528) provide rotatable coupling of the cord 524 to the arm 522. In one particular implementation, the connector pair can be a BNC or coaxial type connector.

Figure 5C:
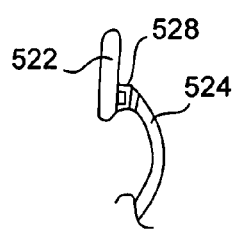
FIG. 5C is a side view of the connection arrangement of FIG. 5B according to one embodiment of the invention when the connector and the connector are coupled together.

FIG. 5C is a side view of the connection arrangement 520 of FIG. 5B when the connector 526 and the connector 528 are coupled together. As a result, a conductor in the cord 524 can be electrically coupled to an electrical component within the arm 522. In one implementation, the connector 528 couples the cord 524 in a flexible or rotatable manner, so as to permit relative movement between the cord 514 and the arm 522 once the connector 526 and the connector 528 are coupled together. For example, the flexible or rotatable coupling can be achieved by a swivel joint at or near the connectors 526 and 528.

Figure 6:
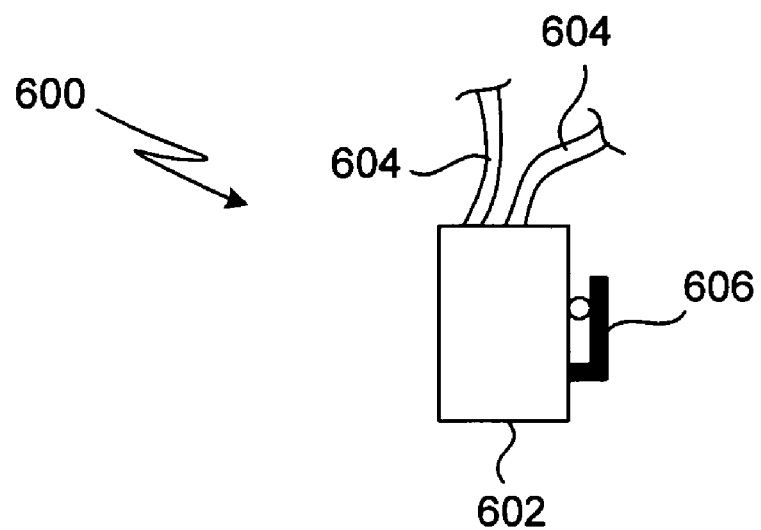
FIG. 6 is a side view of an apparatus having electrical components tethered to another device according to one embodiment of the invention.

FIG. 6 is a side view of an apparatus 600 having electrical components tethered to another device (i.e., tethered electrical components) according to one embodiment of the invention. The apparatus 600 has a base 602, a pair of cords 604, and a clip 606. The clip 606 is affixed to the base 602. The base 602 and the cords 604 can represent any of the embodiments of the invention described herein. The clip 606 is one embodiment of the attachment device 282 discussed above with reference to FIG. 2C.

The apparatus 600 having the clip 606, as an example, can be used to hold the base 602 against an article of clothing worn by the user. For instance, the article of clothing can be a shirt, sweater or jacket worn by the user. More specifically, the clip 606 can hold the base 602 to the collar of a shirt, sweater or jacket worn by the user. Alternatively, instead of a clip, the base 602 can be held against an article of clothing by hook and loop technology (e.g., Velcro®), a pin, tape, a pocket, etc.

Figure 7:
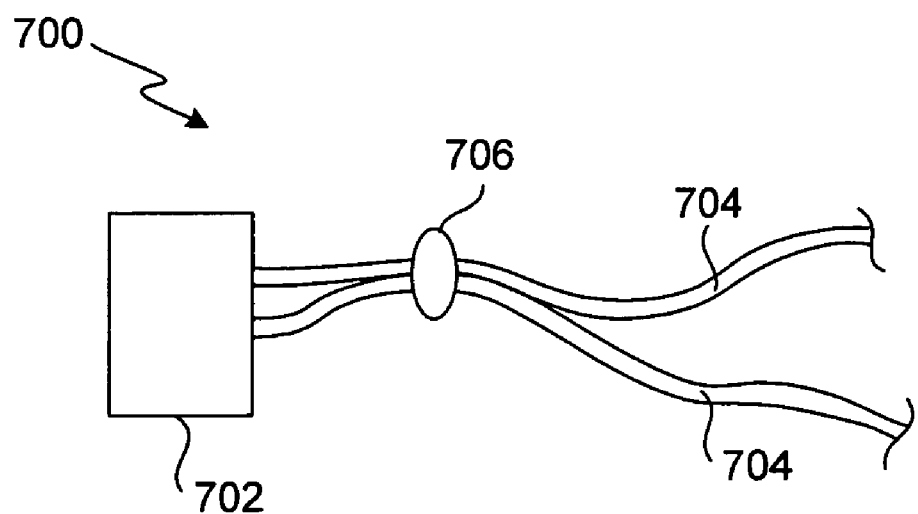
FIG. 7 is a side view of an apparatus having tethered electrical components according to another embodiment of the invention.

FIG. 7 is a side view of an apparatus 700 having electrical components tethered to another device (i.e., tethered electrical components) according to another embodiment of the invention. The apparatus 700 include a base 702, a pair of cords 704, and a ring 706. At least one of the cords 704 can include at least one electrical connector. The ring 706 can be used by a user of the apparatus 700 to tighten the cords 704 about the head of the user when the apparatus 700 is attached to a pair of eyeglasses being worn by the user. The base 702 and the cords 704 can represent any of the embodiments described herein. In one embodiment, the base 702 is integrally formed with the ring 706. In this embodiment, the base 702 tends to be placed at the end of the cords 704. However, the base 702 need not be positioned at the end of the cords 704. In still another embodiment, the base 702 can include or connect to a ring, such that the base 702 can slide along the cords 704 as does a ring while maintaining connection with the at least one electrical connector of at least one of the cords 704.

Figure 8:
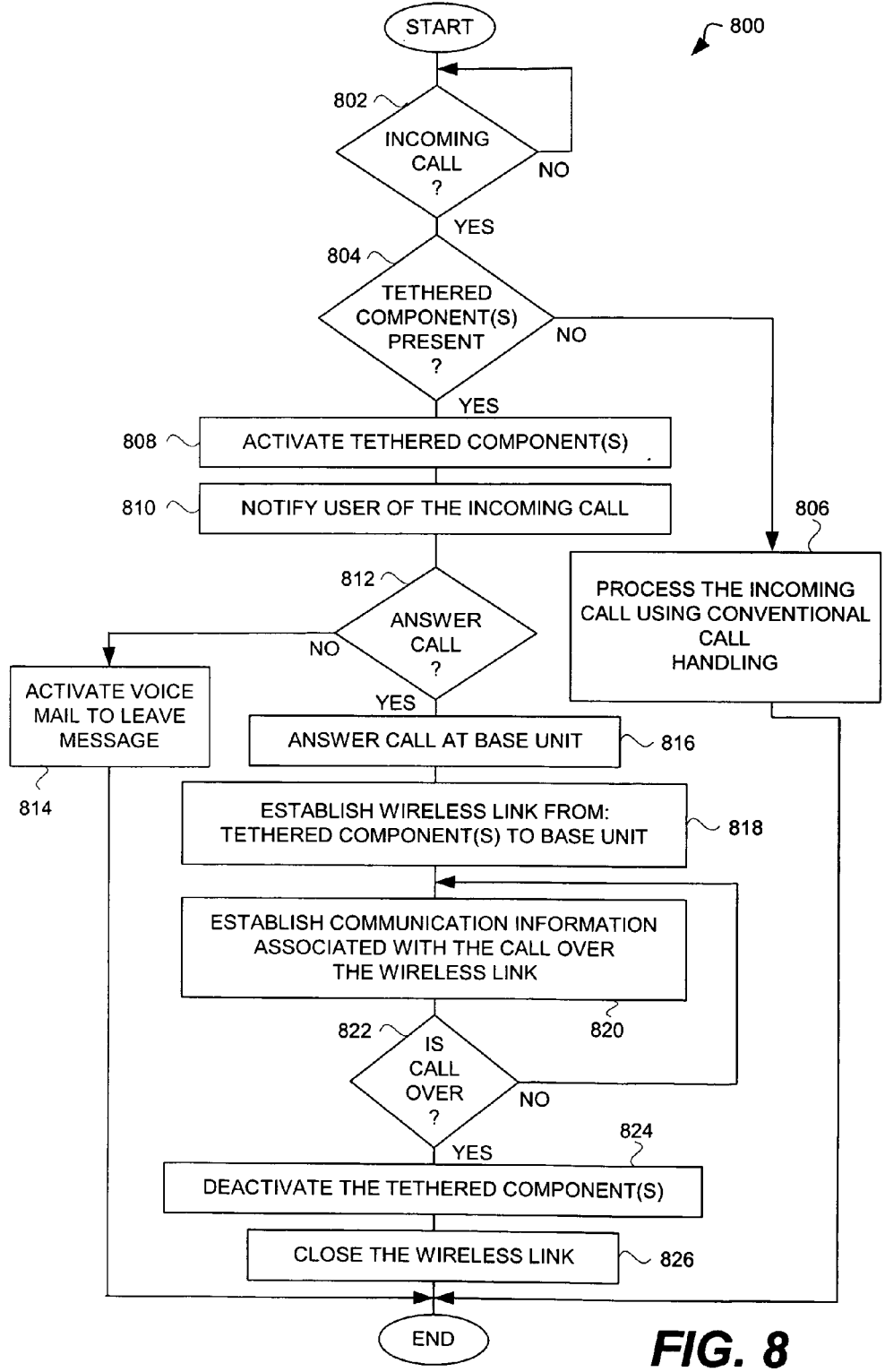
FIG. 8 is a flow diagram of call processing using tethered wireless communication components according to one embodiment of the invention.

FIG. 8 is a flow diagram of call processing 800 using tethered wireless communication components according to one embodiment of the invention. The tethered wireless communication components interact with a communication device. The tethered wireless communication components can be the components within the base 110 shown in FIG. 1, such as the electrical components 250 shown in FIG. 2B. In this embodiment, the communication unit supports two-way communication, such as an audio conversation between two persons. For example, the communication unit can be a mobile telephone (e.g., cellular phone), a computer (desktop or portable), a cordless phone, a speaker phone, a voice-activated device, etc.

The call processing 800 begins with a decision 802 that determines whether a call is incoming. When the decision 802 determines that a call is not incoming, then the call processing 800 waits for such a call. Once the decision 802 determines that a call is incoming, the decision 804 determines whether tethered wireless communication components are present. When the decision 804 determines that tethered wireless communication components are not present, then the incoming call is processed 806 using conventional call handling. In this case, since tethered wireless communication components are not present, the communication unit proceeds to handle the call in a conventional manner without the benefit of tethered wireless communication components.

On the other hand, when the decision 804 determines that tethered wireless communication components are present, then the tethered wireless communication components (tethered components) are activated 808. Here, the wireless communications capability of the tethered components is activated (e.g., powered-up, enabled, or woken-up). The user of the tethered components is then notified 810 of the incoming call. In one embodiment, the notification to the user of the incoming call can be achieved by an audio sound produced by the tethered components and output by a speaker. The speaker is electrically coupled to the tethered components, e.g., such as in the various embodiments noted above. Alternatively, the user of the communication unit could be notified by a vibration of the tethered components, vibration of the frame of the eyeglasses or a base tethered to the glasses, or a visual (e.g., light) indication provided by the eyeglasses or the tethered components. Alternatively, the communication unit could include a ringer that provides audio sound and/or vibration indication to signal an incoming call. Still another alternative is that the tethered components or the frame of the eyeglasses could provide a tactile action to the user so as to notify the user.

Next, a decision 812 determines whether the incoming call has been answered. When the decision 812 determines that the incoming call has not been answered, the communication unit can activate 814 a voice message informing the caller to leave a message or instructing the caller as to the unavailability of the recipient.

On the other hand, when the decision 812 determines that the incoming call is to be answered, the call can be answered 816 at the communication unit. Then, a wireless link is established 818 from the wireless tethered components to the communication unit. The wireless link is, for example, a radio communication link such as utilized with Bluetooth or WiFi networks. Thereafter, communication information associated with the call can be exchanged 820 over the wireless link. Here, the communication unit receives the incoming call, and communicates wirelessly with the tethered components such that communication information is provided to the user via the tethered components. The user is accordingly able to communicate with the caller by way of the tethered components and, thus, in a hands-free manner.

A decision 822 then determines whether the call is over (completed). When the decision 822 determines that the call is not over, the call processing 800 returns to repeat the operation 820 and subsequent operations so that the call can continue. On the other hand, when the decision 822 determines that the call is over, then the tethered components are deactivated 824, and the wireless link and the call are ended 826. The deactivation 824 of the tethered components can place the tethered components in a reduced-power mode. For example, the deactivation 824 can power-down, disable, or sleep the wireless communication capabilities (e.g., circuitry) of the tethered components. Following the operation 826, as well as following the operations 806 and 814, the call processing 800 for the particular call ends.

Although the communication unit utilized with the call processing performs two-way communications, other embodiments of the invention can utilize one-way communications (or at least substantially one-way communications). For example, a communication unit might produce, receive or play audio content such that the audio content is transmitted to the tethered components in a wireless manner. The tethered components then serve as a receiver for the audio content transmitted from the communication unit.

In one embodiment, the communication unit can be a communication device with which tethered components can communicate. The communication unit outputs audio to the tethered components in a wireless manner.

In another embodiment, the communication unit can also be incorporated into the tethered communication components. For example, the tethered components can functionally operate as a two-way communication device (e.g., a mobile telephone). Such tethered components (e.g., communication components) can then, for example, operate as a mobile telephone, and may operate through use of voice-activated commands.

Figure 9:
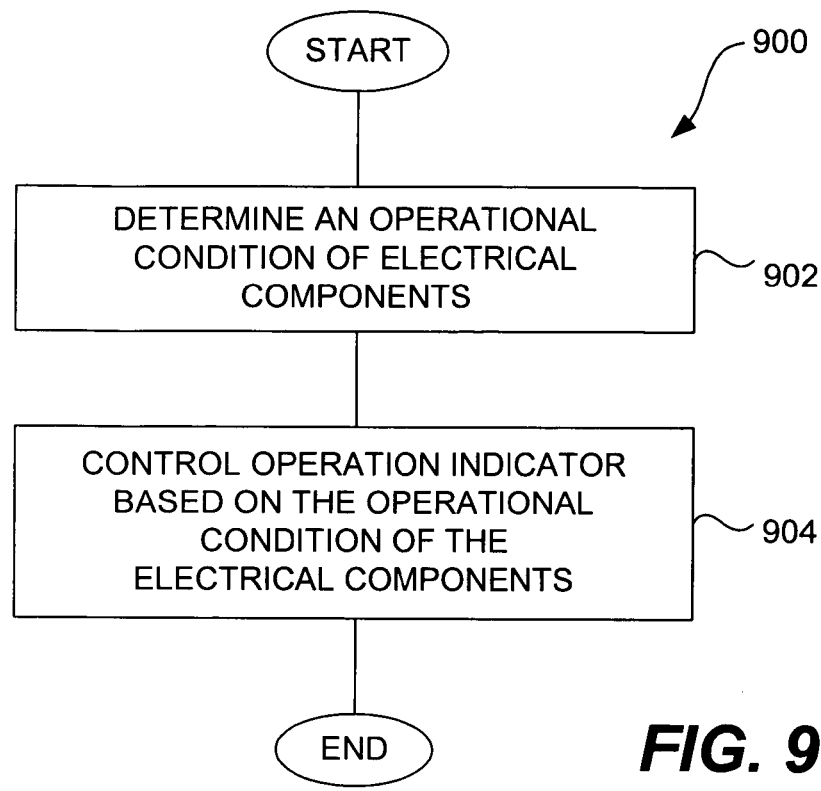
FIG. 9 is a flow diagram of operational condition processing using tethered electrical components according to one embodiment of the invention.

FIG. 9 is a flow diagram of operational condition processing 900 according to one embodiment of the invention. The operational condition processing 900 can, for example, be performed by an apparatus having at least one operation indicator as well as tethered electrical components and/or eyeglass electrical components for a pair of eyeglasses.

The operational condition processing 900 initially determines 902 an operational condition of the electrical components (e.g., tethered electrical components and/or the corresponding eyeglass electrical components). The operational condition can, for example, indicate whether a call is incoming, whether a call is ongoing, or whether the electrical component is in use. Next, at least one operation indicator of the electrical components is controlled 904 based on the determined operational condition. The operation indicator can, for example, be a light source (e.g., light emitting diode). The at least one operation indicator can be positioned at a variety of different places of the eyeglasses or the tethered electrical components. In one embodiment, the tethered electrical components are tethered wireless communication components, and the operation indicator serves as an indicator to others that the user of the tethered electrical components is engaged in a call. In another embodiment, the indicator can signal to the wearer of the tethered electrical components that a call is incoming. Following the operation 904, the operational condition processing 900 is complete and ends.

Figure 10:
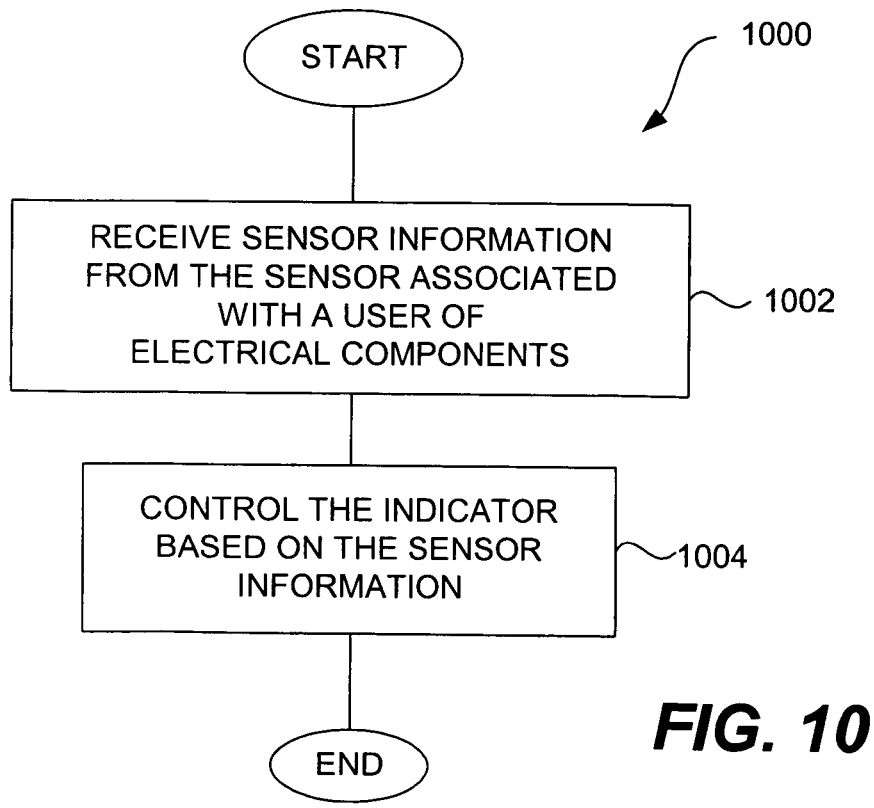
FIG. 10 is a flow diagram of sensor processing using tethered electrical components according to one embodiment of the invention.

FIG. 10 is a flow diagram of sensor processing 1000 according to one embodiment of the invention. The sensor processing 1000 can, for example, be performed by an apparatus having at least one sensor as well as tethered electrical components and/or eyeglass electrical components for a pair of eyeglasses. Optionally, the electrical components further include at least one operation indicator.

The sensor processing 1000 initially receives 1002 sensor information from the sensor. The sensor information is typically associated with the user of the eyeglasses. There can be different types of sensors. The sensors can be considered either eyeglass electrical components or tethered electrical components. For example, the sensor can be a temperature sensor configured to sense the temperature of the user. The sensor can be a humidity sensor configured to sense how much the user has been perspiring. The sensor can sense whether at least one of the user's eyes is open or not. The sensor can sense if the user is crying. The sensor can sense the direction the user is looking. In a general sense, the sensor information can, for example, pertain to physical and/or emotional conditions of the user.

At least one indicator can then be controlled 1004 based on the sensor information. The indicator can be considered either eyeglass electrical components or tethered electrical components. The indicator can, for example, be a light source or a liquid crystal display. Following the operation 1004, the sensor processing 1000 is complete and ends.

The indication provided by the indicator can serve various other purposes. As an example, the indication can represent physical or emotional status of the user of the eyeglasses or the tethered electrical components. For example, the indication can provide an indication of the health or mood of the user of the eyeglasses or the tethered electrical components (e.g., by use of different colored light).

Although the at least one sensor for acquiring the sensor information can be an eyeglass electrical component or a tethered electrical component, it should be noted that the sensor could also be remotely located from the eyeglasses or tethered electrical components, and could also communicate therewith in a wired or wireless manner. Wireless sensors can increase the type of sensor information that can be acquired and utilized.

In one embodiment, the sensor can be a position sensor that provides position information. The position sensor can, for example, be a GPS receiver that is able to fully or partially determine the position of the eyeglasses or its user. The position sensor can be integral with the tethered electrical components and thus, for example, provided in a base portion (e.g., base 110). Alternatively, the position sensor can be provided within the frame (e.g., arm) of the eyeglasses as an eyeglass electrical component.

In one embodiment, the cord is a strap, such as an elastic strap. The strap can include or support one or more electrical components, such as a speaker or a microphone. In another embodiment, all of the electrical components are in or supported by the strap. In yet another embodiment, the strap includes at least one electrical connector to allow electrical components in or supported by the strap to couple to additional electrical components, such as in a base.

In another embodiment, the tethered electrical components can further include a memory module. The memory module can provide non-volatile data storage. For example, the memory module can be a portable (or removable) memory device (e.g., memory card). In one implementation, a base portion (e.g., base 110) of a tethered apparatus can receive the memory module through, for example, a connector at the tethered apparatus. The memory module can, for example, store the sensor information, which can be over an extended period of time. Such memory module can be remotely interrogated using wireless communication circuitry, or can be accessed through a wired connection with tethered electrical components.

In yet another embodiment, tethered electrical components can further provide audio player capabilities. In such an embodiment, a base portion (e.g., base 110) of a tethered apparatus can include an audio player and a battery. The base portion may or may not include wireless communication circuitry. The base portion can also include an audio file storage. The base can couple to one or more speakers through at least one cord.

Further, in an alternative embodiment, the output of an operation indicator (e.g., used with the sensor processing 1000) can be audio that is output to the one or more speakers associated with the tethered apparatus. Such audio output can signal the user using natural language, voice synthesis, pre-recorded messages, one or more audio beeps, etc.

In another embodiment, one or more electrical connections on a base portion (e.g., base 110) of the tethered apparatus facilitate electrical connection with a battery charger. For example, when the power source for the tethered apparatus is a rechargeable battery, the ability to charge the battery without removing the battery from the base portion of the tethered apparatus is advantageous. Hence, in one embodiment, the base portion of the tethered apparatus includes at least one connector or conductive element (e.g., terminal, pin, pad, trace, etc.) so that electrical coupling between the rechargeable battery and the charger can be achieved. In this regard, the electrical connector or conductive element is provided on the base portion of the tethered apparatus and is electrically connected to the battery. In one embodiment, the placement of the electrical connector or conductive element on the base portion serves to allow the tethered apparatus to be placed within a charger and consequently have the electrical connector or conductive element be in electrical contact with a counterpart or corresponding electrical connector or conductive element of the charger. In another embodiment, the base portion can have a port that can couple (e.g., via a cable) with an Input/Output (I/O) port (e.g., USB port) of a computing device (e.g., computer) so as to provide power to charge the battery.

In still another embodiment, the charger can be considered a docking station, upon which the tethered apparatus or the eyeglasses is docked so that the battery within the tethered apparatus or the eyeglasses is able to be charged. Hence, the housing of the tethered apparatus or the eyeglasses can likewise include an electrical connector or conductive element that facilitates electrical connection to the docking station when docked.

In one embodiment, the electrical connection(s) can alternatively be used to allow information stored in the tethered electrical components or eyeglasses to be accessed or queried by a device. For example, when the tethered electrical components include a memory module, the memory module can be accessed to read data (e.g., status information) stored therein.

In yet still another embodiment, a base portion (e.g., base 110) of the tethered apparatus can serve merely as a battery source for eyeglass electrical components. In other words, in this embodiment, the base need not include other types of circuitries such as wireless communication circuitry. In such an embodiment, the size of the base can be largely dependent on the battery size.

The tethered apparatus may be provided with an illuminated or transparent appearance. For example, at least a portion of the base and/or cords can be illuminated or substantially transparent. This can provide not only a unique design appearance but can also facilitate lighting of the tethered apparatus. For example, operation indicators that are light sources, can be completely internal to the base and/or cords and produce light in complex shapes, patterns, etc. through light pipes, fiber optics, LEDs, etc. Further, the tethered electrical components and/or eyeglass electrical components can have numerous light sources to display patterns, and the patterns can coordinate or be synchronous with audio sounds, etc.

In one embodiment the tethered apparatus can further include a solar panel. The solar panel has one or more solar cells that convert light into energy so as to power the electrical components and/or charge the battery for the tethered apparatus or the glasses.

In one embodiment, the eyeglass electrical components can include a switch or a Radio Frequency Identifier (RFID) element.

As previously noted, a base portion (e.g., base 110) of the tethered apparatus can have electrical components pertaining to radiation monitoring circuitry. In such case, the electrical components within the base portion alone or together with eyeglass electrical components can implement a radiation monitoring system. The radiation being monitored can, for example, pertain to one or more of UV, infrared and gamma radiation. In one embodiment, sunlight is considered as a type of radiation. In any case, additional details on radiation monitoring are further described in the related applications that have been incorporated herein by reference.

Also, as previously noted, a base portion (e.g., base 110) of the tethered apparatus can include electrical components pertaining to health or fitness monitoring circuitry. In such case, the electrical components within the base portion alone or together with eyeglass electrical components can implement a health or fitness monitoring system. Additional details on health or fitness monitoring are further described in the related applications that have been incorporated herein by reference.

In yet another embodiment, an electronic component in a temple arrangement of a frame of eyeglasses interacts with an electronic component of a tethered apparatus. For example, a temple arrangement of a pair of eyeglasses holds one portion of an electronic system, and a tethered apparatus that tethers to the pair of eyeglasses includes another portion of the electronic system. In one embodiment, a temple arrangement can be a temple tip, which is usually an enclosure that grabs onto the temple. In another embodiment, a temple arrangement is a temple cover or a temple fit-over. A temple cover slides over and at least partially covers a portion of a temple. If the end of the temple has a temple tip, at least a portion of the temple tip can be covered by the temple cover. A temple fit-over fits over at least a portion of the end of a temple. If the end of the temple has a temple tip, at least a portion of the temple tip is fitted over by the temple fit-over. A temple cover is typically made of a material that is more flexible than a temple fit-over. For example, a temple cover can be a fabric or other materials, such as a sock or sleeve; while a temple fit-over can be made of plastic.

For some glasses, particularly when a pair of glasses has not been extensively worn, a temple arrangement, such as a temple tip, can be relatively easily removed and re-inserted into the glasses. This implies that temple arrangements of different color and/or shape and/or having different electronic components can be applied to the same frame of a pair of glasses. Retailers or distributors can then provide aftermarket modification or enhancement to a pair of glasses, at the preference of their consumers. This, for example, can be done by replacing existing temple tips with replacement temple tips. Or, a consumer can identify the preferred temple arrangements to be purchased with the glasses.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Certain aspects of the invention can be implemented in software, hardware or a combination of hardware and software. Certain aspects of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that electrical components can be separated into two areas, one integral or attached to a pair of eyeglasses, and the other tethered to the pair of eyeglasses. Different components can be positioned in different areas depending on applications and/or aesthetical reasons. For example, power sources can be placed away from but tethered to the eyeglasses to reduce the weight of the eyeglasses. Another advantage of the invention is that additional functionality can be added to eyewear that a user already owns. Another advantage is that additional functionality can be added to eyewear when desired. Another advantage of the invention is the ability to provide hands-free wireless communications capability. Yet another advantage of the invention is that wireless communications, radiation monitoring, fitness monitoring and/or health monitoring can be supported by tethered electrical components. Still another advantage of the invention is that communication, computation, information capturing or sensing, and/or operational capabilities can be provided for eyeglasses without substantial interference to style or design choices, and thus without being apparent that the eyeglasses support such capabilities. Yet another advantage of the invention is that one or more operation indicators can be provided (as tethered electrical components or on or with eyeglasses) for functional reasons (e.g., to indicate operational condition of circuitry or to indicate condition of user), and/or for ornamental purposes also, such as light patterns. Still yet another advantage of the invention is that tethered electrical components for eyeglasses can also include one or more sensors, and can provide storage capabilities for sensor information.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An eyewear system for a user, comprising:
   an eyeglass frame;
   an eyeglass cord; and
   a base device having at least one electrical part,
   wherein said eyeglass cord connects said base device to said eyeglass frame,
   wherein when said eyewear system is worn by the user, said base device is positioned proximate to the neck or upper back region of the user,
   wherein said eyeglass frame is a pair of glasses including at least:
     a first lens holder for receiving lenses, said first lens holder having a first side and a second side,
     a second lens holder for receiving lenses, said second lens holder having a first side and a second side, with the first side of said first lens holder connected to the second side of said second lens holder,
     a first temple coupled to the second side of said first lens holder through a first joint, and
     a second temple coupled to the first side of said second lens holder through a second joint,
   wherein said eyeglass cord includes at least one conductor,
   wherein said eyeglass frame has at least one electrical part internal thereto that is electrically connected through an electrical conductor inside at least one temple and through the at least one conductor within said eyeglass cord to the at least one electrical part in said base device to perform an electrical function, and
   wherein said eyeglass frame can be separately worn by the user without said eyeglass cord and said base device.

2. An eyewear system as recited in claim 1, wherein said eyeglass cord connects to each of the pair of temples of said eyeglass frame.

3. An eyewear system as recited in claim 2, wherein at least one temple includes a temple arrangement, and wherein the at least one electrical part in said eyeglasses is provided in the temple arrangement.

4. An eyewear system as recited in claim 3, wherein the temple arrangement is a temple tip.

5. An eyewear system as recited in claim 1, wherein said cord is made of flexible materials.

6. An eyewear system as recited in claim 1, wherein the at least one electrical part in said eyeglass frame cooperates with the at least one electrical part in said base device to provide an electronic system, which pertains to one or more of a wireless communication system, a radiation monitoring system, a health monitoring system or a fitness monitoring system.

7. An eyewear system as recited in claim 1, wherein said base device includes at least one electrical circuit on a substrate.

8. An eyewear system as recited in claim 1, wherein said base device includes at least one integrated circuit.

9. An eyewear system as recited in claim 1, wherein when said eyewear system is worn by the user, said base device is supported by said eyeglass cord.

10. An eyewear system as recited in claim 1, wherein said eyewear system further comprises:
a clip to attach said base device or said eyeglass cord to an article of clothing worn by the user.

11. An eyewear system as recited in claim 1, wherein said base device is able to be electrically coupled to a portable electronic device.

12. An eyewear system as recited in claim 11, wherein said base device includes a connector for electrically coupling the portable electronic device to said base device via an electrical cable having at least one conductor therethrough.

13. An eyewear system as recited in claim 11, wherein the portable electronic device is a mobile telephone, a personal digital assistant, or a media player.

14. An eyewear system for a user, comprising:
an eyeglass frame having at least one electrical component internal thereto;
an eyeglass cord having at least one electrical conductor therethrough; and
a base device having at least one electrical component,
wherein said eyeglass frame is a pair of glasses including at least:
a first lens holder for receiving lenses, said first lens holder having a first side and a second side,
a second lens holder for receiving lenses, said second lens holder having a first side and a second side, with the first side of said first lens holder connected to the second side of said second lens holder,
a first temple coupled to the second side of said first lens holder through a first joint, and
a second temple coupled to the first side of said second lens holder through a second joint,
wherein when said eyewear system is worn by the user, said base device is positioned proximate to the neck or upper back region of the user,
wherein said eyeglass frame can be separately worn by the user without said eyeglass cord and said base device,
wherein the at least one electrical component in the eyeglass frame is in one of the temples of the glasses, and
wherein said eyeglass cord connects said base device to said eyeglass frame, and said eyeglass cord electrically connects the at least one electrical component in said base device to the at least one electrical component in said eyeglass frame to perform an electrical function.

15. An eyewear system as recited in claim 14,
wherein each of the temples has an electrical connector,
wherein said eyeglass cord has a pair of ends, and each of the ends has an electrical connector, and
wherein each of the electrical connectors at the cord connects with a corresponding one of the electrical connectors at the temples, thereby electrically connecting said eyeglass cord to said eyeglass frame.

16. An eyewear system as recited in claim 14, wherein each of the temples has a temple tip region, and wherein each of the electrical connectors at the temples is provided at the temple tip region of the corresponding temple.

17. An eyewear system as recited in claim 14, wherein said eyewear system further comprises a rechargeable battery, which allows the battery to be charged without removing the battery from said eyewear system.

18. An eyewear system as recited in claim 14, wherein said eyeglass cord has an outer textile cover, and wherein the electrical conductor is internal to the outer textile cover.

19. An eyewear system as recited in claim 14, wherein said eyewear system further comprises a removable memory module.

20. An eyewear system as recited in claim 14, wherein said base device is at least partially physically supported relative to said eyeglass frame by said eyeglass cord.

21. A tethered apparatus for a pair of eyeglasses, said tethered apparatus comprising:
a base containing electrical components; and
at least one cord for attaching said base to the eyeglasses, said cord being attached or attachable to said base, and said cord containing at least one electrical conductor for providing electrical signals from said base through said cord,
wherein said pair of eyeglasses includes at least:
a first lens holder for receiving lenses, the first lens holder having a first side and a second side,
a second lens holder for receiving lenses, the second lens holder having a first side and a second side, with the first side of the first lens holder connected to the second side of the second lens holder,
a first arm coupled to the second side of the first lens holder through a first joint,
a second arm coupled to the first side of the second lens holder through a second joint, and
an electrical component in the eyeglasses, with the component configured to receive the electrical signals from said base through said cord and through an electrical conductor inside at least one arm,
wherein when said base is tethered to the eyeglasses which are being worn by the user, said base is positioned proximate to the neck or upper back region of the user,
wherein when said cord couples said base to the eyeglasses, said base is tethered to the eyeglasses, and
wherein said eyeglasses can be separately worn by a user without the at least one cord and the base.

22. A tethered apparatus as recited in claim 21, wherein said tethered apparatus is configured to have the capability to wirelessly communicate with a portable electronic device of the user to allow information from the portable device to be provided to the user via said tethered apparatus.

23. A tethered apparatus as recited in claim 21, wherein the eyeglasses includes a speaker that is integral with and configured not to be detachable from the eyeglasses.

24. A tethered apparatus as recited in claim 21, wherein said cord attaches to said base with one or a pair of connectors.

25. A tethered apparatus as recited in claim 21,
wherein said cord has first and second ends for coupling to the eyeglasses, and
wherein the first end of said cord couples to one of the arms of the frame and the second end of said cord couples to the other of the arms of the frame.

26. A tethered apparatus as recited in claim 21 wherein said tethered apparatus further includes a removable memory module.

* * * * *

UNITED STATES PATENT AND TRADEMARK OFFICE
CERTIFICATE OF CORRECTION

| | | |
|---|---|---|
| PATENT NO. | : 7,192,136 B2 | Page 1 of 1 |
| APPLICATION NO. | : 10/964011 | |
| DATED | : March 20, 2007 | |
| INVENTOR(S) | : Howell et al. | |

It is certified that error appears in the above-identified patent and that said Letters Patent is hereby corrected as shown below:

Title Page, Under Item (56) References Cited, page 2,

"2003/0226987 A1 12/2003 Ribi et at." should be --2003/0226978 A1 12/2003 Ribi et al.--

Under Item (56) References cited, page 3,

"Bonne Conduction Headgear" should be --Bone Conduction Headgear--; and

"Camoy, David," should be --Carnoy, David--.

Signed and Sealed this

Twenty-fifth Day of August, 2009

David J. Kappos
*Director of the United States Patent and Trademark Office*